United States Patent [19]

Vaughan et al.

[11] Patent Number: 5,328,675
[45] Date of Patent: * Jul. 12, 1994

[54] TRANSITION-METAL-ALUMINOSILICATE HYDROCARBON CONVERSION CATALYSTS HAVING AN L TYPE STRUCTURE, ECR-22-D

[75] Inventors: David E. W. Vaughan, Flemington; Karl G. Strohmaier, Port Murray, both of N.J.

[73] Assignee: Exxon Research & Engineering Co., Florham Park, N.J.

[*] Notice: The portion of the term of this patent subsequent to Jan. 16, 2007 has been disclaimed.

[21] Appl. No.: 11,913

[22] Filed: Feb. 1, 1993

Related U.S. Application Data

[63] Continuation-in-part of Ser. No. 746,263, Aug. 15, 1991, Pat. No. 5,185,138, which is a continuation of Ser. No. 554,627, Jul. 18, 1990, abandoned, which is a continuation-in-part of Ser. No. 281,862, Dec. 5, 1988, abandoned, which is a continuation of Ser. No. 14,206, Feb. 4, 1987, abandoned, which is a continuation of Ser. No. 763,650, Aug. 8, 1985, abandoned.

[51] Int. Cl.$^5$ ............................................. C01B 33/26
[52] U.S. Cl. ............................... 423/328.2; 423/326; 502/64; 502/66; 208/46; 208/111; 208/135; 585/418; 585/666; 585/739
[58] Field of Search ............... 423/710, 328.2; 502/64, 502/77, 60; 208/46, 111, 135; 585/418, 666, 739

[56] References Cited

U.S. PATENT DOCUMENTS

| | | | |
|---|---|---|---|
| 3,720,753 | 3/1973 | Robson | 423/718 |
| 4,534,947 | 8/1985 | Vaughan | 423/709 |
| 4,657,749 | 4/1987 | Vaughan | 423/710 |
| 5,185,138 | 2/1993 | Vaughan et al. | 502/74 |

Primary Examiner—Anthony Mc Farlane
Attorney, Agent, or Firm—Ronald D. Hantman

[57] ABSTRACT

This invention relates to novel zeolitic compositions having zinc as well as aluminum and silicon in the framework tetrahedral positions. The composition has a structure similar to type-L aluminosilicate zeolites. The invention also involves a process of preparation in which one or more divalent transition metals is directly synthesized into the product metalo-aluminosilicate.

21 Claims, 5 Drawing Sheets

TRANSITION-METAL-ALUMINOSILICATE HYDROCARBON CONVERSION CATALYSTS HAVING AN L TYPE STRUCTURE, ECR-22-D

CROSS REFERENCE TO RELATED APPLICATIONS

This is a Continuation-In-Part of U.S. Ser. No. 746,263, filed Oct. 2, 1992, now U.S. Pat. No. 5,185,138, which was a Rule 60 Continuation of U.S. Ser. No. 554,627, filed Jul. 18, 1990, now abandoned, which was a Continuation-In-Part of U.S. Ser. No. 281,862, filed Dec. 5, 1988, now abandoned, which was a Rule 62 Continuation of U.S. Ser. No. 014,206, filed Feb. 4, 1987 (abandoned Dec. 5, 1988), which was a Rule 62 Continuation of U.S. Ser. No. 763,650, filed Aug. 8, 1985 (abandoned Feb. 4, 1987).

FIELD OF THE INVENTION

This invention relates to novel zeolitic hydrocarbon conversion catalyst compositions having one or more transition metals as well as aluminum and silicon in the framework tetrahedral positions. The composition is substantially isostructural with type-L aluminosilicate zeolites. The invention involves a process of preparation in which at least one divalent transition metal is directly synthesized into the product transition-metal-aluminosilicate.

BACKGROUND OF THE INVENTION

Zeolites, although generally viewed as having broad compositional substitution possibilities (Pure and Appl. Chem (1979), 51, p. 1091), are usually defined as crystalline hydrated aluminosilicates of Group I and Group II elements. In particular, those elements include sodium, potassium, calcium, magnesium, barium and strontium. The structure of zeolites is typically an aluminosilicate framework based on an indefinitely extending three dimensional network of $AlO_4$ and $SiO_4$ tetrahedra linked to each other by sharing of the corner oxygens. Zeolites are often represented by the empirical formula $M_2/nO:Al_2O_3: \times SiO_2: y\ H_2O$. In this oxide formula, x is generally greater or equal to 2 since $AlO_4$ tetrahedra are Joined only to $SiO_4$ tetrahedra, and n is the Group I or Group II cation valence. The framework contains channels and interconnected voids which may be occupied by the cation and by water molecules. The cations are often quite mobile and may be exchanged by other cations. Intracrystalline zeolitic water may be reversibly removed. In some zeolites, cation exchange or dehydration may produce structural changes in the framework.

Much zeolite research has focused on the synthesis of zeolite frameworks containing elements other than silicon and aluminum. It is known that gallium ions and germanium ions may be substituted for aluminum and silicon cations in the framework. While an extensive family of aluminum-phosphorus zeolites (AlPO's) has recently been synthesized, the substitution of other elements is the subject of major controversy in the zeolite literature. For instance, U.S. Pat. Nos. 3,329,480 and 3,329,481, both issued to D. A. Young, report the existence of crystalline zirconosilicate and titanosilicate zeolites. A zeolite having chromium in the tetrahedral positions has been described by Yermolenko et al at the Second Oil Union Conference on Zeolites, Leningrad, 1964, pages 171-8 (published 1965). However, D. W. Breck, in Zeolite Molecular Sieves, p. 322, John Wiley & Sons (1974) suggests that the chromium present was not present in a zeolite A structure and furthermore was present as an impurity in insoluble form. The impurity was said to be in the form of a chromium silicate as confirmed by the nature of the water vapor adsorption isotherm. The zeolite ZSM-5 reportedly has been synthesized with many elements other than Al in the framework, including Fe, B, Cr, etc.

Because of the presence of phosphorus in tetrahedral $PO_4$ units in certain rare zeolites, extensive work has been done to synthesize zeolites containing $PO_4$ tetrahedral. Various phosphorus containing zeolites have been prepared and reported in Breck, supra, p. 323 et seq. The synthesis technique for production of phosphorus-containing zeolites generally involves crystallization from a gel in which the phosphorus is first incorporated by a controlled copolymerization and co-precipitation of all of the component oxides in the framework, i.e., aluminate, silicate, and phosphate in the homogeneous gel phase. The crystallization of the gel is then carried out at a temperature between 80° C. and 210° C.

The synthesis of iron-containing zeolitic structures has been reported. Japanese Kokai 59,121,115, published July 13, 1984, disclosed an aluminosilicate having a faujasite structure and containing coordinated iron. The chemical composition is said to be of the formula $aM_2/nO.b\ Fe_2O_3.Al_2O_3.cSiO_2$ where M can be H, alkali metal or alkaline earth metal. The symbol n is the valence of M; $a=1\pm0.3$; c is between 4.6 and 100; and a is less than b and both are less than 7. The relation between the IR absorption wave number (Y) in $cm^{-1}$ and the crystal lattice parameter $a_o$ is said to be expressed as $Y \leq -116.7a_o + 3920$.

Similarly, U.S. Pat. No. 4,208,305 (Eur. Pat. No. 115,031.A) discloses a crystalline ferrosilicate having the general formula:

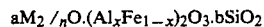

$$aM_2/nO.(Al_xFe_{1-x})_2O_3.bSiO_2$$

where M is a cation of valence n, $a=0-2.0$, $b=3-100$ and $x=0-0.98$. The composition is said to have a uniform pore diameter of 4-5Å and a characteristic x-ray powder diffraction pattern of:

| 2θ | d(Å) | Rel. Intensity |
|---|---|---|
| 10.9–11.1 | 8.12–7.97 | M–VS |
| 13.4–13.5 | 6.61–6.56 | M–S |
| 17.4–17.5 | 5.10–5.07 | M–S |
| 21.0–21.1 | 4.23–4.21 | M–S |
| 22.0–22.1 | 4.40–4.02 | M–VS |
| 20.6 | 3.121 | M–S |
| 32.3–32.4 | 2.772–2.763 | M–S |

(VS = very strong; S = strong; M = medium)

The composition is formed by maintaining a mixture having a molar oxide composition of: 0–10 $R_2O$:1–15 $M_2/n$:$(Al_xFe_{1-x})_2O_3$: 10–200 $SiO_2$:200–1000 $H_2O$ where R is an organic templating agent.

A range of metallo-alumino-phosphates and metallo-silicoalumino-phosphates compositions have recently been reviewed (Flanigen et al, in "Innovations in Zeolite Materials Science" Ed Grobet et al., SSSC v. 37, p. 13 (Elsevier)). The structure and composition of this invention has not been reported in such families of materials.

None of this literature discloses a transition-metal-aluminosilicate hydrocarbon conversion catalyst composition substantially isostructural with L zeolite and having the chemical composition disclosed herein.

SUMMARY OF THE INVENTION

This invention deals with a composition of matter comprising a transition-metal-aluminosilicate hydrocarbon conversion catalyst having an L type zeolite structure.

The transition metal may be present in the framework, cation and interstitial sites of the zeolite structure. The generalized synthesized chemical composition is:

1.0 to 1.5 $K_2O$: yDO: $Al_2O_3$: 2 to 20 $SiO_2$: 0 to 10 $H_2O$ where $0.10 < y < 2.50$, and D is at least one divalent transition metal, preferably Ni, Co or Zn, or mixtures thereof.

In addition, iron, gallium and germanium may be substituted for aluminum and silicon respectively. Potassium may be partly replaced in the synthesis by Na and other Group 1A or 2A cations. Typically the divalent transition metal is distributed between the framework (T) sites and cation sites, but may also be in interstitial channel sites. Such distribution, introduced during the zeolite synthesis, gives these materials properties different from either the zeolite without transition metal in the synthesis or materials post exchanged with the transition metal. FIGS. 1-3 show the differences between the X-ray diffraction patterns at 25° C. and 900° C. of the nickel ECR-22 of this invention (FIG. 1), typical KL (FIG. 2) and $Ni^{2+}$ exchanged KL (FIG. 3), demonstrating the superior stability of Ni-ECR-22D. Differential thermal analyses confirm these differences. A Synchrotron X-ray diffraction Rietfeld structure analysis has shown that Ni may be distributed between cation and framework sites. Work on ALPO and MeAPO zeolite structures (reviewed by Flanigen et al., Proc. 7th Intl. Zeolite Conf., p. 103 (1986), Kodansha/Elsevier (Tokyo)) shows that in the hydrated state not only do the transition metals partition between framework and cation sites and may show multiple coodination when occupying framework positions (Thomas et al., Chem. Mater., v.3, p. 667 (1991); Kraushaar-Czarnetzki etal., J. Chem. Soc. Faraday, V.87, p. 891 (1991); Olender et al., J. Amer. Chem. Soc., v.115 (1993)), but Al and P do so too (Blackwell and Patton, J. Phys. Chem., v.92, p. 3965 (1988)). As a function of temperature, such partly hydroxylated transition metals loose hydroxyl groups and anneal into the tetrahedral frameworks. The same process seems to occur with ECR-22D with a portion of the transition metal component, in which case the previous formulation can be recalculated to an equivalent partitioned zeolite stoichiometry, with framework (bDO) and non-framework (aDO) components, approximating:

1.0 to 1.5 $K_2O$: aDO: ((1-b)$Al_2O_3$: bDO): 2 to 20 $SiO_2$; 1 to 10 $H_2O$ where $a/(a+b)$ is the fraction of divalent transition metal (DO) in non-framework sites and $b/(a+b)$ the fraction of DO in framework sites, the latter is between 0.02 and 0.50.

The process for synthesizing the inventive transition metal aluminosilicate hydrocarbon conversion catalyst involves the direct introduction of a divalent transition metal salt containing Ni, Co or Zn, or mixtures of same, into the zeolite synthesis reaction gel prior to the crystallization process.

Experiments with these materials reacted with $H_2S$ at high temperatures show that the transition metal reacts to form the metal sulfide, but that such framework depletion of T atoms and cations do not cause the framework to collapse in the cases of single channel restricted pore systems. (In contrast, in the case of more open and less rigid faujasite frameworks, the lattice does collapse rendering the zeolite amorphous or significantly degraded.) This unique reactivity towards $H_2S$ allows these transition metal substituted materials to act as sulfur absorbers, or sinks and scavengers, under reaction conditions and therefore to protect the noble metal (usually Pt or Pd) from deactivation due to sulfur containing feedstocks in catalytic applications. We have discovered that such transition metal framework substituted zeolites seem to be "protected" catalysts as they do not show the deterioration in catalytic activity expected from catalysts containing such high transition metal contents, and may have significant selectivity advantages in some operations. In most hydrocracking, reforming and isomerization systems hydrogen is recycled after removal of most contaminants, such as sulfur compounds, in an external purification system (usually a fixed bed cyclic absorbent process). Sulfur is the major contaminant which poisons the active catalyst promoters. The transition metal directly synthesized zeolites of this invention clearly offer the advantages of acting as a polishing sulfur trap in the catalyst itself providing additional sulfur protection in case of process upsets, inadequate pretreatment or feed contamination. They would seem to offer unique advantages in the instances where the noble metal is particularly sensitive to poisoning, as in the case, for example, of aromatization of paraffinic feedstocks reported by Hughes and coworkers (Proc. 7th. International Zeolite Conf., Ed. Murakami et al., p. 725 (1986), Kodansha/Elsevier (Tokyo)).

DESCRIPTION OF THE PREFERRED EMBODIMENTS

Figure 1:
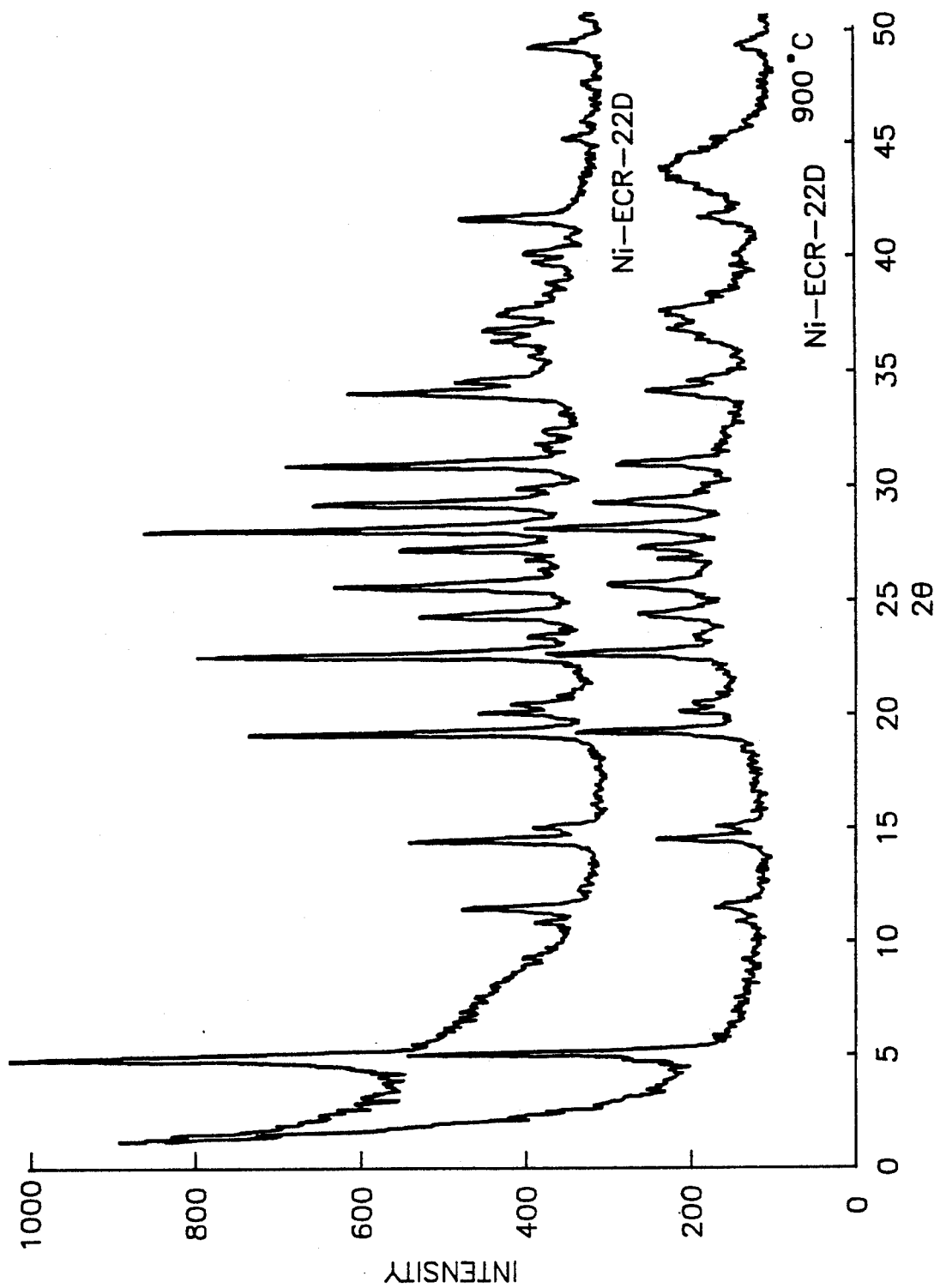
FIG. 1 compares the X-ray diffraction patterns for a sample of Ni-ECR-22D "as synthesized" and after calcining in air for one hour at 900° C.

The invention herein is, in general terms, a transition metal aluminosilicate hydrocarbon catalyst composition having the transition metal present in the framework, cation and interstitial sites of the zeolite structure. A more desirable composition of matter has a chemical makeup in the range:

1.0 to 1.5 $K_2O$: yDO: $Al_2O_3$: 2 to 20 $SiO_2$: 0 to 10 $H_2O$ where $0.10 < y < 2.50$, and D is at least one divalent transition metal, preferably Ni, Co or Zn, or mixtures of same.

An even more preferable transition metal aluminosilicate is the composition with $0.20 < y < 1.50$. In addition, iron, gallium and germanium may be substituted for aluminum and silicon respectively. Potassium may be partly replaced by sodium, other Group 1A and 2A cations.

When the added transition metal is divalent, there appears to be a tendency for the metal to partition between the framework and the cation positions, presumably to offset the higher framework negative charge with divalent cations in a restricted number of sites.

Each of these compositions is quite similar in structure, or may be substantially isostructural with, the known L type of zeolite structure but having other metal ions in tetrahedral framework positions in addition to $Al^{3+}$ and $Si^{4+}$. As will be discussed below, the structure of this metalo-alumino-silicate, ECR-22-D, has two distinctly different tetrahedral (or "T atom") positions. Given the size and electronic differences between, say, Ni and Si, the silicon ions might be expected to segregate to one position and the nickel ions to the other.

The Type-L zeolite is a known synthetic zeolite which crystallizes in the hexagonal system and has a characteristic X-ray diffraction pattern obtained from CuKα radiation with the major d(Å) peak values set out in the table of U.S. Pat. No. 3,216,789, the entirety of which is incorporated by notice. Zeolite L itself has a general formula as follows:

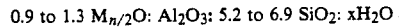

0.9 to 1.3 $M_{n/2}O$: $Al_2O_3$: 5.2 to 6.9 $SiO_2$: $xH_2O$ where M designates at least one exchangeable cation, n represents the valence of M and x is 0 to 9. Zeolite L has channel-shaped pores of from 7 to 12Å in diameter.

The L-Type structure, depending usually upon the Si/Al framework composition, has been variously called Type L, Ba-GL, and ECR-2 (U.S. Patent, to Vaughan). All appear to have the structure proposed by Barter and Villiger in *Ziet. Krist.*, 128 (1969), p. 352. The structure has a single 12-ring channel parallel to the 'c' axis of the crystal.

Although Type-L zeolites, often in their hydrogen form, have been employed as catalytic dewaxing catalysts and in other applications, they have been found to be particularly useful in the reforming of hydrocarbons since they decrease the amount of hydrocracking which occurs during that reforming step. U.S. Pat. No. 4,104,320 to Bernard etal. discloses that the use of zeolite L as a catalyst support increases the selectivity of the reaction for producing aromatic products.

The use of Type-L zeolites in the aromatization of linear alkanes to aromatics is disclosed in a series of cases filed by the assignee of this invention on Nov. 10, 1983: Set. Nos. 550,889; 550,902; 550,952. These disclosures involve a Type-L zeolite which, most desirably, has been substantially exchanged with potassium cations and has platinum particles of a particular configuration included therein.

In any event, acidity of the zeolite is an important variable in such reactions as reforming as is the substitution of different elements into the framework positions. The framework substitution results in more subtle changes in the selectivity and the activity of the zeolite, particularly in processes where low or moderate acidity is important, e.g., isomerization or dehydrocyclization.

It is anticipated that the metallo-aluminosilicate, ECR-22-D, may provide the basis of various processes for forming high silica zeolites. The transition metal may be easier to remove by acid leaching of the framework by virtue of the higher solubility of their ionic forms in acidic solutions and a lower tendency to form polymeric species at acid pH. Similarly, hydrothermal treatment of these metalloaluminosilicates should preferentially hydrolyze the framework transition metal, making it more readily removable, and thus enhancing the silica content of the framework. Such materials have been shown to be useful catalysts for the production of aromatics from n-paraffins (U.S. Pat. No. 4,832,824).

Other zeolites having transition metals, such as nickel, precipitated therein are known isomerization catalysts. Catalysts in which the transition metal is precipitated from the framework positions in the zeolite may have different catalytic properties, including a tendency to rapidly degrade by metal plugging of the pores under reducing conditions.

The metalo-alumino-silicate of this invention may be prepared by forming a reaction mixture comprising an alumina source, a silica source, a divalent transition metal source, and a potassium oxide source.

The potassium oxide source may be its silicates or hydroxides. The silica may be derived from a wide variety of sources. For instance, the source may be a silica gel, silica acid, aqueous colloidal silica sols, fume silicas and chemically precipitated silica sols. The potassium and silica may be derived from a single source such as potassium silicate.

The alumina source may be potassium aluminate, metakaolin alumina, hydrated alumina, aluminum alkoxides or the like.

The transition metal source may be any divalent transition metal containing soluble salt, e.g., nitrates, chlorides, sulfates, etc. .

The relative amounts of ingredients in the reaction mixture will be such that the mixture has a composition, in terms of mole ratios of oxides, within the following ranges:

| Oxide Constituents | General Ranges | Preferred Ranges |
|---|---|---|
| $SiO_2:Al_2O_3$ | 2 to 30 | 3 to 16 |
| $DO:Al_2O_3$ | .05 to 1.6 | 0.2 to 1.0 |
| $K_2O:(Al_2O_3 + DO/2)$ | 1.6 to 9 | 2 to 6 |
| $H_2O:(Al_2O_3 + DO/2)$ | 80 to 400 | 100 to 250 |

Although the order of mixing the ingredients, apart from adding the acid metal salt last, is not believed to be critical in that the ingredients may be added simultaneously or sequentially, the preferred method is somewhat more involved.

The preferred method involves preparation of a potassium aluminate solution by dissolving the alumina source in a hot concentrated potassium hydroxide solution. Preferably, the temperature is at or near 100° C.

The transition metal source is dissolved in water, possibly acidified with an acid having an anion the same as the dissolved metal source.

The potassium aluminate solution is then mixed, preferably with vigorous stirring, with a potassium silicate solution. The transition metal solution is slowly added to the resulting mixture, also with vigorous mixing.

Regardless of the raw materials used, the acidic transition metal source should be added last since it causes gellation of the mix. Seeding is known to be particularly effective in promoting crystallization in the LTL system.

The resulting reaction mixture is then placed in a reactor, ordinarily one which can withstand elevated pressures, e.g., a polytetrafluoroethylene-lined Jar or autoclave. The mixture is maintained at a temperature between about 80° C. and 250° C., preferably between about 90° C. and 160° C. Most preferably, the temperature is about 150° C. The exact temperature will, of course, depend upon the amount of alkali metal oxides present and the length of time available for reaction.

When the homogenized mixture is heated, it is maintained at the autogeneous pressures resulting from the temperature employed. The length of time required to produce the transition-metal-aluminosilicate crystals will depend mainly upon temperatures employed. At the most preferable temperature of 150° C. the time required for reaction is generally in the range of two to six days. Broadly, the heating will take place for as long as is desired or necessary to produce crystals of the desired product.

The product crystals may be recovered by, e.g., filtration or centrifugation, and are then washed to remove extra mother liquor. The washing should continue, with the wash water equilibrated with the product crystals, until the water has a pH between about 9 and about 12. The crystals may then be dried.

The composition of this invention may be used as a sorbent or a catalyst. In either of these applications, it may be desirable, or even necessary, to exchange the non-tetrahedral sites within the composition with cations from any of one or more members of Groups I through VIII of the Periodic Table or the rare earth metals, depending upon the intended end use. Preferably, the cations will be mono-, di-, or tri-valent metal cations, particularly from Groups I, II or III of the Periodic Table, such as barium, calcium, cesium, lithium, magnesium, sodium, potassium, strontium, zinc or the like. Hydrogen, rare earth metals, or ammonium or alkylammonium ions may be used in certain instances. The ions may be exchanged before or after calcination of the composition to remove excess or included water. The presence of these exchangeable cations will not generally cause a substantial change in the structure of the transition-metal-aluminosilicate ECR-22-D catalyst compositions.

The exchanged ECR-22-D catalysts are fabricated into extrusions, pills, spheres, granules or other suitable catalyst form by mixing with an inert binder material followed by any of the well-known forming procedures well-known in the art, such as extruding, pilling, etc. In such cases the binder will usually comprise between 2 and 40 wt % of an inorganic oxide; clays, such as kandites, smectites, etc.; or graphite, long chain fatty acids and similar inert lubricants. In some cases, often with careful choice of the cation exchanged form, the catalyst may be self-bound, that is prepared with no binder material, particularly in the case of pressure pilling or tableting. Additional catalytic metals of Group 8 of the Periodic Table may be impregnated onto, or into, the catalyst either before or after this forming operation.

As noted above, the active composition of this invention has a structure isostructural with the Type-L aluminosilicate zeolite except that an amount of the transition metal is found in the tetrahedral framework positions and in the cation sites.

The more desirable catalyst promoter, "as synthesized", composition has a chemical formula in the range:

1.0 to 1.5 $K_2O$: $yDO$: $Al_2O_3$: 2 to 20 $SiO_2$: 0 to 10 $H_2O$ where $0.10 < y < 2.50$, and D is at least one divalent transition metal, preferably Ni, Co or Zn, or mixtures thereof.

An even more preferable composition having the chemical composition where:

$0.1 < y < 1.5$.

The typical X-ray powder diffraction pattern is thus:

| 2θ    | D(Å)          | Rel. Intensity |
|-------|---------------|----------------|
| 5.45  | 16.10 ± .15   | VS             |
| 11.65 | 7.57 ± .03    | W              |
| 14.57 | 6.06 ± .02    | W              |
| 19.14 | 4.63 ± .01    | M              |
| 22.47 | 3.95 ± .01    | M-S            |
| 24.18 | 3.67 ± .01    | W              |
| 25.40 | 3.50 ± .02    | M-S            |
| 26.92 | 3.3 ± .01     | M              |
| 27.70 | 3.7 ± .01     | M-S            |
| 28.92 | 3.08 ± .01    | M-S            |
| 30.51 | 2.92 ± .01    | M-S            |
| 33.57 | 2.67 ± .01    | M-S            |

(VS = very strong; S = strong; M = medium; W = weak)

Based on these and other data, the average hexagonal unit cell size is believed to be about 18.54 (±0.2) Å along the 'a' axis and about 7.55Å along the 'c' axis. The pore size is about 6Å. These are a bit larger than are the unit cell sizes for an aluminosilicate Type-L. It is believed that the longer metal-oxygen bond is responsible for such variations. The inventive metalo-alumino-silicate is capable of adsorbing, after heating in air at moderate temperatures, e.g., 400° C., for dehydration, an amount of hexane equal to at least 6.0% by weight.

A comparative x-ray diffraction pattern for an alumino-silicate zeolite L is given in Table 1 for comparison purposes. When compared with the transition metal forms there are clear examples of missing lines and major line intensity differences.

TABLE 1

| X-ray Diffraction Pattern Lines for Type-L Zeolite | | | |
|------|-------|-----------|-------|
| hkl  | 2θ    | d-spacing | I/I₀  |
| 100  | 5.49  | 16.1      | 100   |
| 200  | 11.08 | 7.97      | 11    |
| 001  | 11.72 | 7.55      | 31    |
| 210  | 14.68 | 6.03      | 24    |
| 111  | 15.16 | 5.84      | 22    |
| 220  | 19.28 | 4.60      | 49    |
| 310  | 20.09 | 4.42      | 17    |
| 301  | 20.44 | 4.34      | 15    |
| 221  | 22.41 | 3.931     | 64    |
| 311  | 23.28 | 3.818     | 8     |
| 320  | 24.26 | 3.666     | 30    |
| 410  | 25.53 | 3.486     | 50    |
| 202  | 26.16 | 3.404     | 3     |
| 321  | 37.11 | 3.286     | 24    |
| 500  | 27.99 | 3.185     | 61    |
| 330  | 29.05 | 3.071     | 42    |
| 420  | 29.65 | 3.010     | 7     |
| 222  | 30.66 | 2.913     | 46    |
| 510  | 31.20 | 2.864     | 2     |

TABLE 1-continued

| X-ray Diffraction Pattern Lines for Type-L Zeolite | | | |
|---|---|---|---|
| hkl | 2θ | d-spacing | I/I$_o$ |
| 331 | 31.45 | 2.842 | 3 |
| 421 | 32.00 | 2.794 | 6 |
| 600 | 33.76 | 2.653 | 25 |
| 430 | 34.15 | 2.623 | 16 |
| 412 | 35.18 | 2.549 | 3 |
| 601 | 35.84 | 2.503 | 7 |
| 103 | 36.33 | 2.471 | 9 |
| 502 | 37.04 | 2.425 | 13 |
| 521 | 37.83 | 2.376 | 2 |
| 530 | 39.60 | 2.274 | 6 |
| 223 | 41.03 | 2.198 | 22 |
| 313 | 41.44 | 2.177 | 3 |
| 621 | 42.57 | 2.122 | 2 |

EXAMPLES

The following examples illustrate the invention without limiting it in any way. In each of the examples, parts and percentages are given by weight and temperature is given in degrees Centigrade, unless otherwise noted.

EXAMPLE 1

Figure 4:
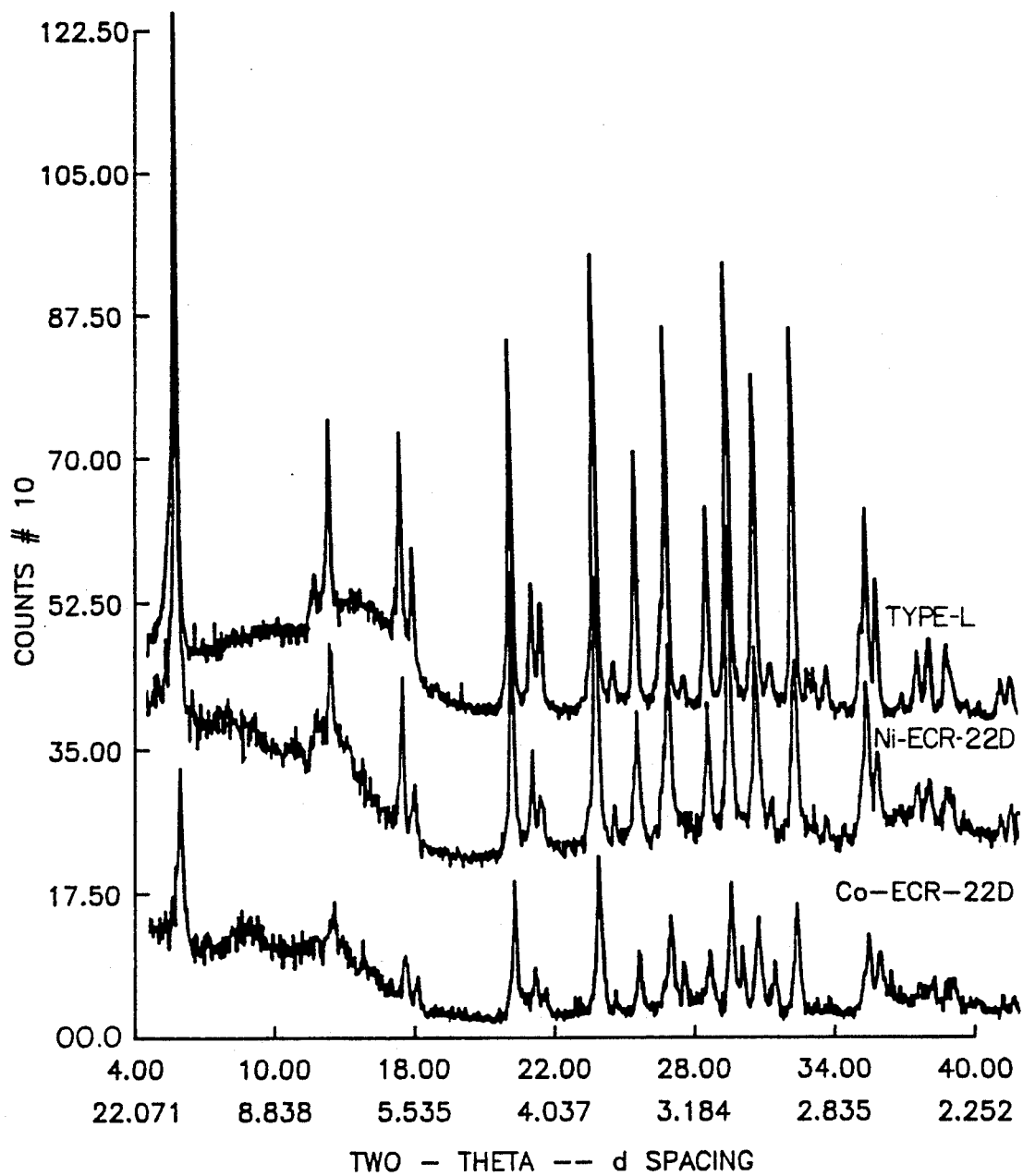
FIG. 4 compares the X-ray powder diffraction patterns of, respectively, a KL zeolite, a Ni-ECR-22D and a Co-ECR-22D, the latter two made according to this invention.

A cobalt-containing ECR-22-D was made by adding a potassium aluminate solution (11.5 gm KOH.½ H$_2$O + 16 gm H$_2$O + 5.39 gm Al$_2$O$_3$.3SH$_2$O) to 142 gm potassium silicate, thoroughly homogenizing the gel, and then adding 16.4 gm CoCl$_2$.6H$_2$O dissolved in 25 gm H$_2$O. After adding sufficient water to balance the total weight at 250 gm, the cobalt aluminosilicate gel was thoroughly homogenized prior to hot aging. After 3 days aging at 150° C. the sample was filtered, washed with deionized water and dried at 100° C. The sample gave the x-ray diffraction pattern shown in Table 2 and FIG. 4. After calcining for 1 hour at 350° C., this Co-ECR-22 sorbed 9 wt % hexane. The unit cell was determined to be a=18.42Å and c=7.56Å. Chemical analysis gave a composition 11.2 wt % K; 5.17% Al; 11.5% Co; 24.3% Si; representing an oxide stoichiometry:

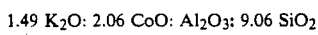

1.49 K$_2$O: 2.06 CoO: Al$_2$O$_3$: 9.06 SiO$_2$

Assuming that Co$^{2+}$ is partitioned between framework and cation sites in ECR-22-D, this oxide stoichiometry can be restated in zeolite mineralogical formulation thus:

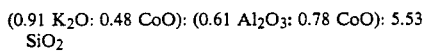

(0.91 K$_2$O: 0.48 CoO): (0.61 Al$_2$O$_3$: 0.78 CoO): 5.53 SiO$_2$ with the first bracket indicating non-framework species and the second bracket framework species, in which case the Si/(Al+Co) ratio becomes very typical for an LTL type zeolite Si/Al equivalent ratio. This seems justified on the basis of the high sorption capacity which seems to preclude significant occluded material or impurity.

TABLE 2

| X-ray Diffraction Lines Co-ECR-22-D | | | |
|---|---|---|---|
| hkl | 2θ | d-spacing (Å) | I/I$_o$ |
| 100 | 5.50 | 16.1 | 100 |
| 200 | | | |
| 001 | 11.72 | 7.54 | 20 |
| 210 | 14.67 | 6.03 | 21 |
| 111 | 15.16 | 5.84 | 16 |
| 220 | 19.25 | 4.61 | 61 |
| 310 | 20.06 | 4.42 | 22 |
| 301 | 20.38 | 4.35 | 15 |
| 221 | 22.62 | 3.927 | 71 |
| 311 | | | |
| 320 | 24.24 | 3.668 | 27 |
| 410 | 25.54 | 3.485 | 51 |
| 202 | 20.06 | 3.416 | 11 |
| 321 | 27.07 | 3.291 | 38 |
| 500 | 27.95 | 3.189 | 64 |
| 330 | 29.05 | 3.072 | 49 |
| 420 | 29.70 | 3.005 | 25 |
| 222 | 30.65 | 2.914 | 52 |
| 510 | | | |
| 331 | | | |
| 421 | | | |
| 600 | 33.71 | 2.656 | 55 |
| 430 | 34.18 | 2.621 | 42 |
| 412 | 34.97 | 2.564 | 10 |
| 601 | 35.82 | 2.505 | 15 |
| 103 | 36.33 | 2.471 | 25 |
| 502 | 36.82 | 2.439 | 4 |
| 521 | 37.10 | 2.421 | 12 |
| 530 | 39.56 | 2.276 | 12 |
| 223 | | | |
| 313 | | | |
| 621 | | | |

EXAMPLE 2

A nickel-containing ECR-22-D was made using the general method of Example 1, except that the constituent CoCl$_2$.6H$_2$O was replaced by 16.4 gm NiCl$_2$.6H$_2$O. The composition of the reaction slurry was therefore:

| | |
|---|---|
| 5.39 gm | Al$_2$O$_3$.3H$_2$O (Alcoa, c31 alumina) |
| 142 gm | potassium silicate (PQ Corp., Ksil6) |
| 11.5 gm | KOH.½ H$_2$O |
| 16.4 gm | NiCl$_2$.6H$_2$O |
| 748 gm | H$_2$O |

After seven days reaction at 150° C., the experiment was terminated, and the product filtered, washed and dried. The x-ray diffraction pattern is given in Table 3 and FIG. 4. After drying at 350° C. the sample sorbed 8.9 wt % n-hexane at room temperature and 50 torr. The unit cell was a=18.42Å, c=7.56Å. Chemical analysis gave a product composition of 9.7% K; 5.66% Al; 10.8% Ni; 23.1% Si, representing an oxide stoichiometry of:

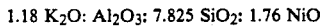

1.18 K$_2$O: Al$_2$O$_3$: 7.825 SiO$_2$: 1.76 NiO

Figure 2:
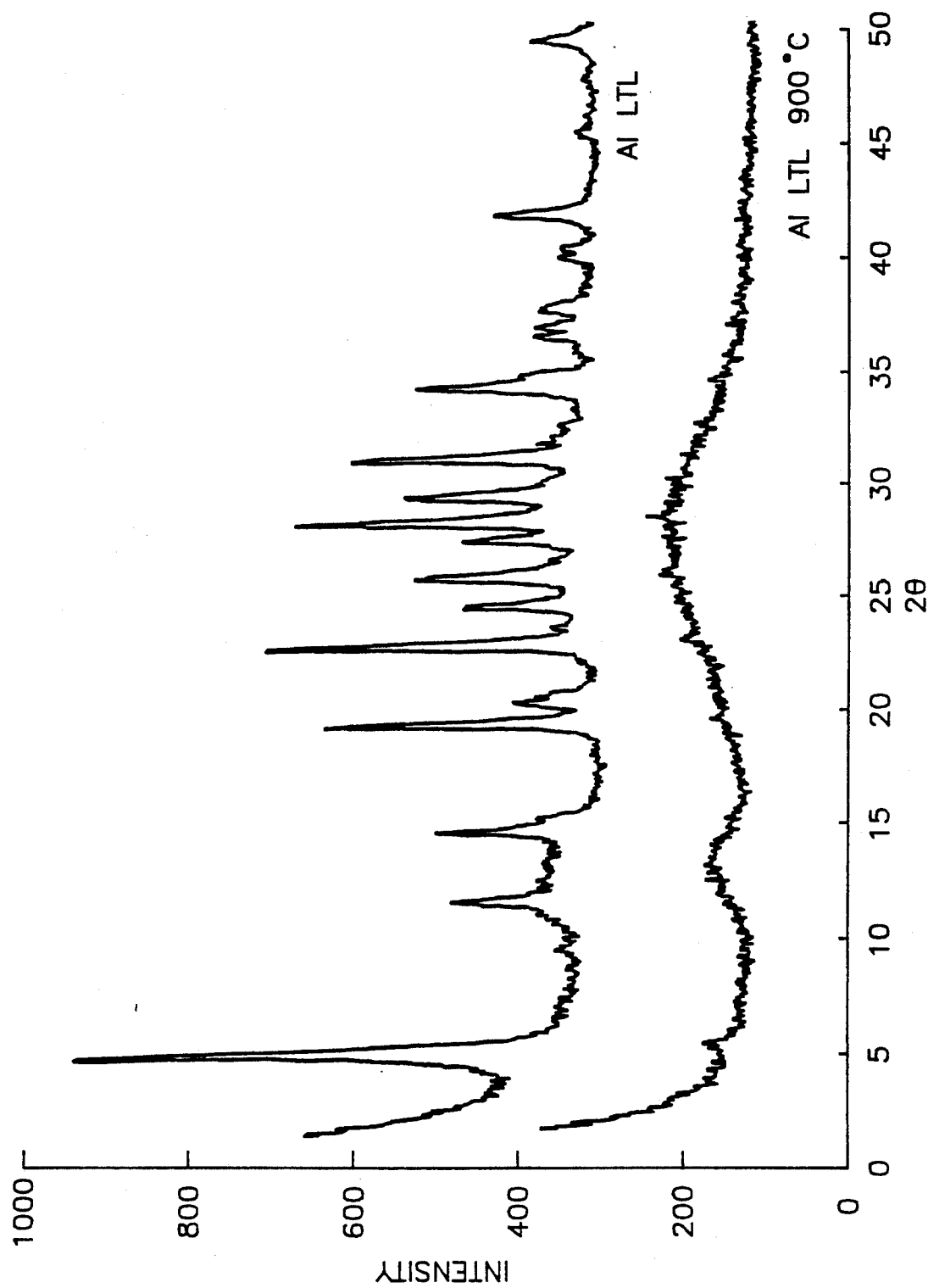
FIG. 2 is the same for a metal free sample of aluminosilicate KL.
Figure 3:
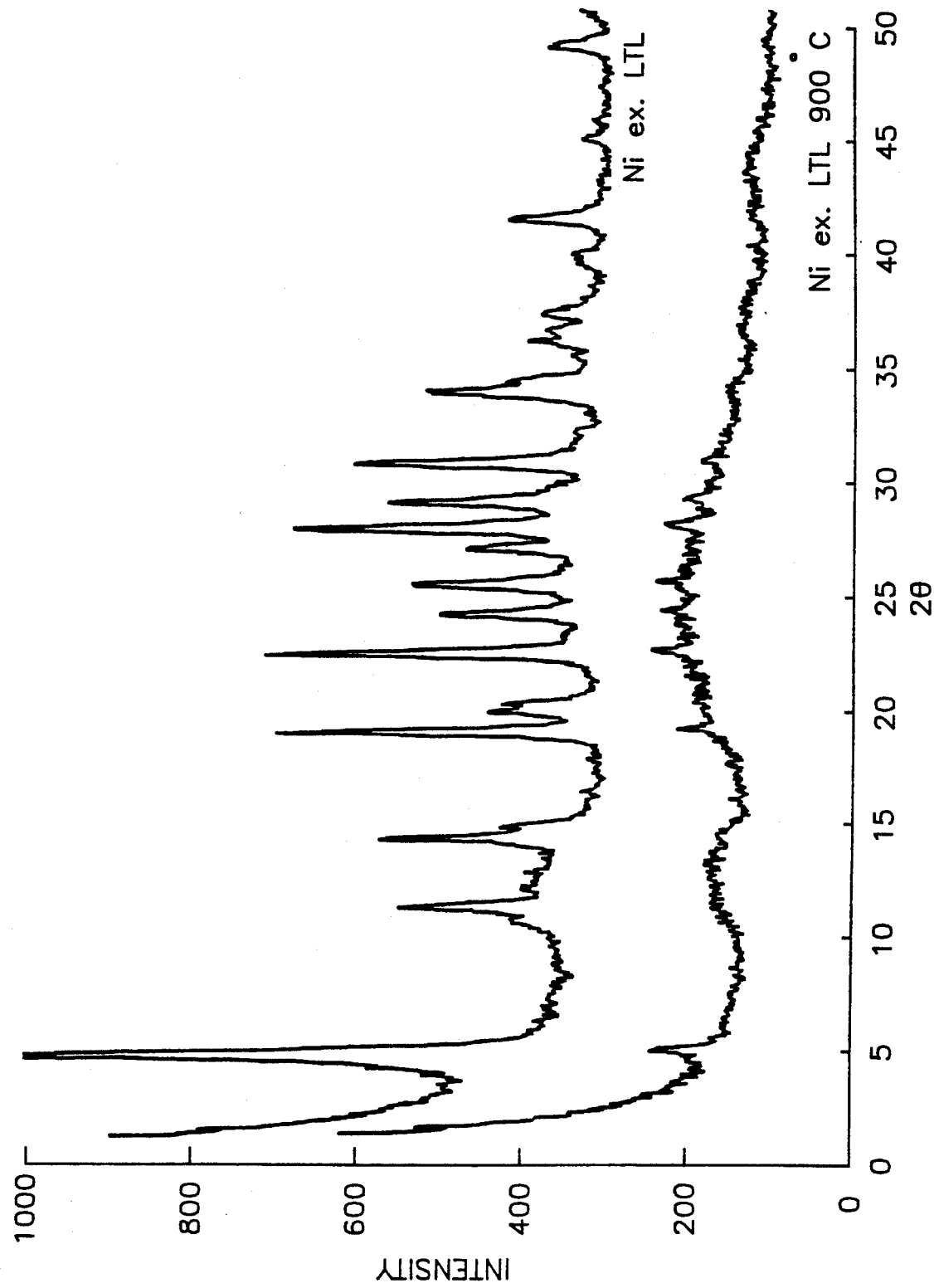
FIG. 3 is the same for a nickel chloride exchanged sample of the same KL sample of FIG. 2.
Figure 5:
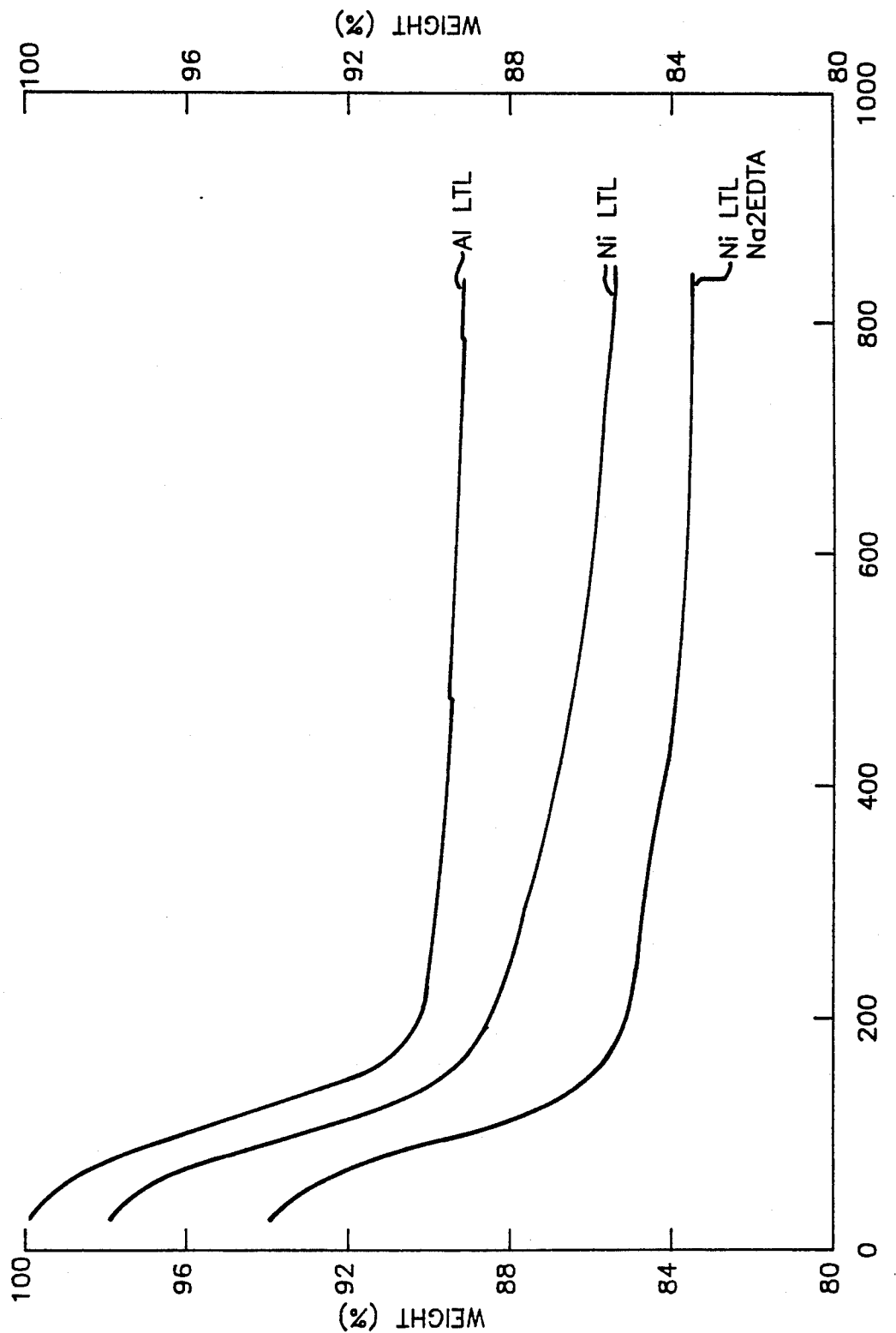
FIG. 5 compares thermogravimetric analyses for samples of KL, Ni-ECR-22D and the latter after treatment with $Na_2H_2EDTA$.

X-ray diffraction analyses of this material "as synthesized" and after treatment at 900° C. for one hour are compared in FIG. 1, and show a surprising high temperature stability. Compared to similarly treated typical KL (FIG. 2) and a Ni$^{2+}$ exchanged KL (FIG. 3), both of which collapse under this treatment, ECR-22D is a material of superior stability—an important property for any catalyst. A synchrotron X-ray diffraction structure analysis of Ni-ECR-22D indicated that the data can be best resolved by partitioning the Ni$^{2+}$ between framework and cation sites, with a preference for 6-ring framework sites. FIG. 5 compares the dehydration behaviour of standard Al-KL, which loses its zeolitic water below 250° C. with samples of this Ni-ECR-22D, showing an extended water loss above 250° C. reflecting high temperature dehydroxylation of the Ni$^{2+}$, also compared with the latter after a treatment with a solution of Na$_2$H$_2$EDTA which selectively removes Ni but not Al from the framework sites. In this case the step of water loss at about 400° C. is interpreted as dehydroxylation of framework "hydroxyl nests" occupying sites formerly containing Ni. An EXAFS evaluation of this hydrated Ni-ECR-22D indicated pentahedral $Ni^{2+}$ with Ni-O bond distance of 2.04Å. This compares with a known near tetrahedral Ni-O bond length of 1.99Å in a calcined, dehydrated, Ni-SAPO-34 (Thomas etal, ibid). A similar case has been observed in Mn-APSO-44 (Olender, ibid) in which framework $Mn^{2+}$ changes from octahedral to tetrahedral coordination on dehydration at 400° C. Furthermore, n-hexane sorption isotherms at room temperature show rectangularity and high capacity comparable to a pure zeolite L, indicating no channel blockage either by excess potassium and nickel cations, salts of these ions or detrital nickel oxides or hydroxides. Analysis of the composite data for this ECR-22D indicates that $Ni^{2+}$ is partitioned between framework and cation sites, and that little Ni is external to the zeolite or blocking the 12-ring channel. On this basis the above oxide formulation can be recalculated to a possible zeolite stoichimetry:

(0.80 $K_2O$, 0.52 NiO): (0.67 $Al_2O_3$, 0.66 NiO): 5.28 $SiO_2$ in which the first bracket indicates cation composition and the second bracket the degree of framework substitution. This Si/(Al+Ni) ratio is typical for known Si/Al ratios in LTL zeolites.

TABLE 3

X-ray Diffraction Pattern Lines for Ni-ECR-22-D

| hkl | 2θ | d-spacing (Å) | I/I$_o$ |
|---|---|---|---|
| 100 | 5.49 | 16.08 | 100 |
| 200 | | | |
| 001 | 11.67 | 7.57 | 22 |
| 210 | 14.65 | 6.04 | 19 |
| 111 | 15.14 | 5.85 | 15 |
| 220 | 19.24 | 4.61 | 46 |
| 310 | 20.05 | 4.43 | 14 |
| 301 | 20.40 | 4.35 | 8 |
| 221 | 22.62 | 3.93 | 60 |
| 311 | 23.30 | 3.814 | 5 |
| 320 | 24.26 | 3.666 | 27 |
| 410 | 25.53 | 3.486 | 40 |
| 202 | | | |
| 321 | 27.07 | 3.291 | 25 |
| 500 | 27.96 | 3.188 | 51 |
| 330 | 29.03 | 3.073 | 35 |
| 420 | | | |
| 222 | 30.65 | 3.010 | 8 |
| 510 | | | |
| 331 | 31.42 | 2.845 | 4 |
| 421 | | | |
| 600 | 33.70 | 2.657 | 42 |
| 430 | 34.10 | 2.622 | 19 |
| 412 | | | |
| 601 | | | |
| 103 | 36.28 | 2.474 | 9 |
| 502 | | | |
| 521 | 37.12 | 2.420 | 7 |
| 530 | 39.56 | 2.276 | 6 |
| 223 | | | |
| 313 | | | |
| 621 | | | |

EXAMPLE 3

A typical synthetic aluminosilicate L zeolite was prepared as a standard comparison with the novel metallo-aluminosilicate compositions of this invention using a gel formulation of:

3 $K_2O$: $Al_2O_3$: 9$SiO_2$: 135 $H_2O$ reacted at 100° C. for two and a half days in a polypropylene container. The product had a stoichiometry of:

1.04 $K_2O$: $Al_2O_3$: 5.3 $SiO_2$

To make a catalyst, 15 gm of this sample was exchanged with a solution of 15 gm ammonium chloride dissolved in 120 gm distilled water at 60° C. for one hour; filtered on a vacuum filter, washed with 150 ml. 10% ammonium chloride solution on the filter followed by 300 ml distilled water. The sample was calcined for six hours at 320° C. in an air oven, and then given a second slurry ammonium chloride exchange in a like manner to the first exchange. This time the sample was air dried on the filter, then reslurried with 100 ml aqueous ammonia (29% $NH_3$) for 30 minutes, followed by filtration, washing on the filter with 100 ml distilled water, and drying at 110° C. in an air oven. 5.7 gm of this sample were exchanged to a Pt (metal) level of about 1% by contacting it with a solution of 0.101 gm Pt($NH_3$)$_4$$Cl_2$ dissolved in 20 ml aqueous ammonia for 20 minutes at room temperature; filtered on a vacuum filter, then air dried on the filter, followed by 16 hours in an air oven at 110° C. This sample was then formed into one inch tablets in a Carver Press and these were then crushed and sieved to a particle size range of 0.2 to 0.4 mm. The sample was then placed in a vacuum oven at 50° C., ramped to 250° C. in one hour, and held at 250° C. for one hour, at which time the temperature was reduced to 150° C. 4 gm of this catalyst was weighed into a dish and placed in a desiccator containing 3A (i.e., K-LTA) molecular sieves.

This 4 gm catalyst sample was then loaded into a 0.5 inch diameter stainless steel reactor, and topped to 12 cm bed depth with 0.1 to 0.2 mm diameter glass beads. Reactor start-up procedures ramped the temperature to 454° C. at a rate of 3° C./minute under a hydrogen flow rate of 100 ml/minute STP (10 barG. pressure), and held the reactor at this temperature for 15 minutes before reducing the temperature to the operational temperature. At this time the n-hexane feed was introduced into the hydrogen stream to give an n-hexane equivalent space velocity (WHSV) of 2, a H2/n-hexane of 2.5, and a pressure of 10 barG. Samples were recovered and analyzed on line by gas chromatography at appropriate times. These results are shown in Table 4.

EXAMPLE 4

A reaction mixture having the following oxide ratios:

3 $K_2O$: (0.75Al,0.25Fe)$_2O_3$:9 $SiO_2$: 140 $H_2O$ was made by first adding 43.9 g aluminum oxide trihydate in a solution containing 43.9 g KOH..5$H_2O$ and 65 ml $H_2O$. This solution was heated to a boil until alumina dissolved and then cooled down. The final weight of this potassium aluminate solution was 118.3 g. In a plastic beaker were mixed 286.7 g of a potassium silicate solution (12.5% $K_2O$; 26.3% $SiO_2$; Kasil-6, P.Q. Corp.), 51.2 g potassium aluminate solution, 4.2 g $Al_2(SO_4)_3$.17-$H_2O$ in 4.2 ml $H_2$, and 18.9 g $FeCl_3$.6$H_2O$ in 25 mls $H_2O$. The total weight of the mixture was adjusted to 500 g by addition of $H_2O$, and then thoroughly homogenized in a blender. It was placed in a 500 ml teflon bottle and reacted at 100° C. for five days. The product was filtered, washed with distilled $H_2O$, and dried in a 115°

C. oven. X-ray powder diffraction analysis showed the crystalline phase to be excellent iron substituted zeolite L. Elemental analysis by ICP-AES and AA gave 13.4% K, 25.4% Si; 6.17% Al; 4.69% Fe. This represents a product stoichiometry of $$1.1\ K_2O: (0.27\ Fe, 0.73\ Al)_2O_3: 5.46\ SiO_2$$

with Fe principally in the framework positions (Pickering et al. Proc. Int. Zeolite Conf, Butterworth-Heinemann Press. (1992)).

15 gm of this iron aluminosilicate L zeolite product was exchanged with a solution of 15 gm ammonium chloride dissolved in 120 gm distilled water at 60° C. for one hour; filtered on a vacuum filter, washed with 150 ml 10% ammonium chloride solution on the filter followed by 300 ml distilled water. The sample was calcined for six hours at 320° C. in an air oven, and then given a second slurry ammonium chloride exchange in a like manner to the first exchange. The sample was air dried on the filter, then reslurried with 100 ml aqueous ammonia (29% NH$_3$) for 30 minutes, followed by filtration, washing on the filter with 100 ml distilled water, and drying at 110° C. in an air oven. This sample was formed into one inch tablets in a Carver Press and these were then crushed and sieved to a particle size range of 0.2 to 0.4 mm. The sample was then placed in a vacuum oven at 50° C., ramped to 250° C. in one hour, and held at 250° C. for one hour, at which time the temperature was reduced to 150° C. 4 gm of this catalyst was weighed into a dish and placed in a desiccator containing 3A (i.e., K-LTA) molecular sieves. (Note that this catalyst does not contain platinum.) Catalytic results for this catalyst, obtained in a similar manner to those for Example 3, are compared with the same for Example 3 in Table 4.

EXAMPLE 5

A reaction mixture having the following oxide ratios:

$$3\ K_2O: 0.5\ NiO, 0.75\ Al_2O_3: 9\ SiO_2: 140\ H_2O$$

was made by first adding 43.9 g aluminum oxide trihydate in a solution containing 43.9 g KOH..5H$_2$O and 65 ml H$_2$O. This solution was heated to a boil until alumina dissolved and then cooled down. The final weight of this potassium aluminate solution was 118.3 g. In a plastic beaker were mixed 287.6 g of a potassium silicate solution (12.5% K$_2$O; 26.3% SiO$_2$; Kasil-6, P.Q. Corp.), 47.4 g potassium aluminate solution, 16.6 g NiCl$_2$.6H$_2$O, and 14.2 g Al$_2$(SO$_4$)$_3$.17H$_2$O in 14.2 ml H$_2$O. The total weight of the mixture was adjusted to 500 g by addition of H$_2$O, and then thoroughly homogenized in a blender. It was placed in a 500 ml teflon bottle and reacted at 100° C. for five days. The product was filtered, washed with distilled H$_2$O, and dried in a 115° C. oven. X-ray powder diffraction analysis showed the crystalline phase to be excellent ECR-22D. Elemental analysis by ICP-AES and AA gave 12.4% K; 24.0% Si; 7.16% Al; 4.33% Ni giving an oxide composition of $$1.19\ K_2O: 0.56\ NiO: Al_2O_3: 6.5\ SiO_2.$$

15 gm of this nickel aluminosilicate L zeolite product was converted into a Pt co-promoted catalyst by first exchanging with a solution of 15 gm ammonium chloride dissolved in 120 gm distilled water at 60° C. for one hour; filtered on a vacuum filter, washed with 150 ml 10% ammonium chloride solution on the filter followed by 300 ml distilled water. The sample was calcined for six hours at 320° C. in an air oven, and then given a second slurry ammonium chloride exchange in a like manner to the first exchange. This time the sample was air dried on the filter, then reslurried with 100 ml aqueous ammonia (29% NH$_3$) for 30 minutes, followed by filtration, washing on the filter with 100 ml distilled water, and drying at 110° C. in an air oven. 10.5 gm of this sample were exchanged to a Pt (metal) level of ~1% by contacting it with a solution of 0.186 gm Pt(NH$_3$)$_4$Cl$_2$ dissolved in 37 ml aqueous ammonia for 20 minutes at room temperature; filtered on a vacuum filter, then air dried on the filter, followed by 1.5 hours in an air oven at 110° C. This sample was then formed into one inch tablets in a Carver Press and these were then crushed and sieved to a particle size range of 0.2 to 0.4 mm. The sample was then placed in a vacuum oven at 50° C. ramped to 250° C. in one hour, and held at 250° C. for one hour, at which time the temperature was reduced to 150° C. 4 gm of this catalyst was weighed into a dish and placed in a desiccator containing 3A (i.e., K-LTA) molecular sieves.

This catalyst was evaluated using the identical procedure to that used for Examples 3 and 4, with which they are compared in Table 4, showing good activity in the range of 360° C. and high iso-C$_6$ yields. The co-promoted catalyst of this example is similar in activity and selectivity to Example 3 but attains it at a temperature about 25° C. lower than Example 3, despite the heavy loading of nickel in the zeolite. In the conversion of sulfur containing feedstocks, the presence of nickel in the catalyst of this example should sufficiently protect the noble metal from sulfur poisoning so as to yield superior product distributions and extended 'on stream' lifetimes. After over 19 hours on oil the catalyst showed no signs of aging (unlike conventional exchanged or impregnated nickel catalysts), indicated by constant and steady yield patterns at several temperatures. This co-promoted framework substituted catalyst is clearly superior to the conventional Pt only promoted catalyst of Example 3.

TABLE 4

| Catalyst | Example 3 | Example 3 | Example 3 | Example 4 | Example 4 | Example 5 | Example 5 |
|---|---|---|---|---|---|---|---|
| Temp °C. | 310 | 360 | 380 | 310 | 360 | 310 | 360 |
| Time on oil | 3 hr | 7 hr | 12 hr | 11 hr | 19 hr | 6 hr | 19 hr |
| Conversion | 9.74 | 65.87 | 71.05 | 2.07 | 7.31 | 5.03 | 75.18 |
| C1 | 0.02 | 0.03 | 0.11 | 0.01 | 0.21 | 0.01 | 2.67 |
| C2 | 0 | 0.06 | 0.59 | 0 | 0.08 | 0 | 0.35 |
| C3 | 0.05 | 1.09 | 5.99 | 0.02 | 0.71 | 0 | 2.21 |
| i-C4 | 0.02 | 0.57 | 2.13 | 0.01 | 0.21 | 0 | 0.81 |
| n-C4 | 0.02 | 0.36 | 1.26 | 0.01 | 0.25 | 0.01 | 1.69 |
| i-C5 | 0 | 0.47 | 1.49 | 0.01 | 0.21 | 0 | 1.58 |
| n-C5 | 0.03 | 0.27 | 0.89 | 0.03 | 0.29 | 0.17 | 1.82 |
| 2,2-DMB | 0.05 | 4.41 | 2.94 | 0.04 | 0.13 | 0.01 | 7.64 |
| 2,3-DMB | 0.13 | 5.14 | 6.16 | 0.14 | 0.57 | 0.04 | 5.05 |

TABLE 4-continued

| Catalyst | Example 3 | Example 3 | Example 3 | Example 4 | Example 4 | Example 5 | Example 5 |
|---|---|---|---|---|---|---|---|
| 2-MeC5 | 5.46 | 31.91 | 29.52 | 0.9 | 2.71 | 2.44 | 30.33 |
| 3-MeC5 | 3.86 | 21.39 | 19.79 | 0.76 | 1.8 | 2.15 | 20.63 |
| n-C6(feed) | 90.29 | 34.13 | 28.95 | 97.93 | 92.69 | 94.97 | 24.82 |
| Mecyclo-C5 | 0.12 | 0.14 | 0.14 | 0.12 | 0.11 | 0.14 | 0.24 |
| Benzene | 0 | 0.04 | 0.1 | 0 | 0 | 0 | 0.09 |
| cyclo-C6 | 0 | 0.06 | 0 | 0 | 0 | 0.02 | 0.04 |

These results show that the unique divalent framework substituted metallo-aluminosilicates of this invention, co-promoted with noble metals, are improved over the original hydrocarbon conversion catalysts compositions. The incorporation of high sulfur affinity transition metals in the zeolite framework is a novel approach to sulfur resistant catalyst formulations.

Having thus described the invention and provided examples showing the synthesis and the product, it should be apparent to those having ordinary skill in this art that obvious variations of the process of making the composition would be within the scope of this invention as described below.

What is claimed is:

1. A crystalline microporous transition-metal-aluminosilicate having a structure substantially isostructural with L aluminosilicate zeolite and wherein a portion of Ni, Co, Zn or mixtures thereof is in the tetrahedral position of the transition-metal-aluminosilicate.

2. The transition-metal-aluminosilicate of claim 1 having the following chemical composition:

1.0 to 1.5 $K_2O$: yDO: $Al_2O_3$: 2 to 20 $SiO_2$: 0 to 10 $H_2O$ where $0.10 < y < 2.50$, and D is at least one of Ni, Co or Zn, or mixtures thereof.

3. The transition-metal-aluminosilicate of claim 2 wherein:

$0.1 \leq y \leq 1.5$

4. The transition metal aluminosilicate of claim 3 wherein D is Ni.

5. The transition metal aluminosilicate of claim 3 wherein D is Co.

6. The transition metal aluminosilicate hydrocarbon of claim 3 wherein D is a mixture of Co and Zn.

7. The transition metal aluminosilicate of claim 3 wherein D is a mixture of Ni and Co.

8. The transition metal aluminosilicate of claim 3 wherein D is a mixture of Ni and Zn.

9. The transition-metal-aluminosilicate of claim 1 which has been at least partially ion exchanged with a cation from any one or more of Groups I through VIII of the Periodic Table, the rare earth metals, or an ammonium or alkylammonium cation.

10. The transition-metal-aluminosilicate of claim 2 which has been exchanged with one or more metal cations selected from the group consisting of barium, calcium, cesium, lithium, magnesium, sodium, potassium, strontium or zinc.

11. A process for producing a microporous transition-metal-aluminosilicate having a structure isostructural with an L aluminosilicate structure and transition metal within the tetrahedral framework of the transition-metal-aluminosilicate, comprising the steps of:
    preparing a reaction mixture comprising an alumina source, a silica source, a divalent transition-metal-source and a potassium oxide source, with substantial mixing,
    maintaining the reaction mixture at a temperature and for a time sufficient to crystallize said transition-metal-aluminosilicate,
    recovering said transition-metal-alumino-silicate.

12. The process of claim 11 wherein the reaction mixture has a composition, in terms of mole ratios of oxides, within the following ranges:

| | |
|---|---|
| $SiO_2:Al_2O_3$ | 2 to 30 |
| $DO:Al_2O_3$ | 0.5 to 1.6 |
| $K_2O:(Al_2O_3 + DO/2)$ | 1.6 to 9 |
| $H_2O:(Al_2O_3 + DO/2)$ | 80 to 400 | wherein D is at least Ni, Co or Zn, or mixtures thereof.

13. The process of claim 12 wherein the reaction mixture has a composition, in terms of mole ratios of oxides, within the following ranges:

| | |
|---|---|
| $SiO_2:Al_2O_3$ | 3 to 16 |
| $DO:Al_2O_3$ | 0.2 to 1.0 |
| $K_2O:(Al_2O_3 + DO/2)$ | 2 to 6 |
| $H_2O:(Al_2O_3 + DO/2)$ | 100 to 250 |

14. The process of claim 12 wherein D is Ni.

15. The process of claim 12 wherein D is Co.

16. The process of claim 12 wherein D is a mixture of Co and Zn

17. The process of claim 12 wherein D is a mixture of Ni and Co.

18. The process of claim 12 wherein D is a mixture of Ni and Zn.

19. The process of claim 12 wherein D is a mixture of Ni, Co and Zn.

20. The process of claim 11 wherein said transition metal aluminosilicate is post-treated with a solution of a noble metal of Group 8 of the Periodic Table so as to deposit between 0.1 and 3.0 wt % of said metal within the catalyst.

21. The process of claim 20 wherein the metal is Pt, Pd or a mixture of Pt and Pd.

* * * * *